(12) United States Patent
Zhang et al.

(10) Patent No.: US 8,737,211 B2
(45) Date of Patent: May 27, 2014

(54) METHODS AND APPARATUSES FOR NETWORK CONFIGURATION OF USER EQUIPMENT COMMUNICATION MODES IN MULTIFLOW SYSTEMS

(75) Inventors: Danlu Zhang, San Diego, CA (US); Rohit Kapoor, San Diego, CA (US); Sharad Deepak Sambhwani, San Diego, CA (US); Prashanth Sharma, San Diego, CA (US); Bibhu Prasad Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 13/563,285

(22) Filed: Jul. 31, 2012

(65) Prior Publication Data

US 2013/0194921 A1    Aug. 1, 2013

Related U.S. Application Data

(60) Provisional application No. 61/514,858, filed on Aug. 3, 2011, provisional application No. 61/522,178, filed on Aug. 10, 2011.

(51) Int. Cl.
  *H04L 12/26*   (2006.01)
  *H04L 12/56*   (2006.01)

(52) U.S. Cl.
  CPC ...................... *H04L 47/10* (2013.01)
  USPC ............................ 370/230; 370/328; 370/331

(58) Field of Classification Search
  CPC ................................ H04L 47/00; H04L 12/00
  USPC .......................................... 370/230, 328, 331
  See application file for complete search history.

(56) References Cited

U.S. PATENT DOCUMENTS

| 7,242,670 B2 | 7/2007 | Yi et al. |
| 7,551,596 B2 | 6/2009 | Kim et al. |

(Continued)

FOREIGN PATENT DOCUMENTS

| EP | 1284583 A2 | 2/2003 |
| EP | 1523134 A1 | 4/2005 |

(Continued)

OTHER PUBLICATIONS

Anand J, et al: "Architecture, implementation, and evaluation of a concurrent multi-path real-time transport control protocol," Military Communications Conference, 2007. MILCOM 2007. IEEE. IEEE, Piscataway, NJ, USA, Oct. 29, 2007, pp. 1-7, XP031232821, Introduction sections II.A and II.B.

(Continued)

*Primary Examiner* — Andrew Lai
*Assistant Examiner* — Sumitra Ganguly
(74) *Attorney, Agent, or Firm* — Charles Chesney

(57) ABSTRACT

The present disclosure provides methods and apparatuses for improved UE communication mode determination by a network entity, such as a radio network controller, where multi-cell and multi-carrier communication is available to the UE in a wireless network. For example, in an aspect, methods and apparatuses are provided for determining whether a user equipment (UE) is in a soft handover region and a softer handover region, and where the UE is in such a region, predicting a future multi-cell performance of the UE assuming the UE will be served by a plurality of cells on a single carrier, predicting a future multi-carrier performance of the UE assuming the UE will be served by a plurality of carriers of a single cell, comparing the future multi-cell performance to the future multi-carrier performance, and transmitting a mode command to the UE based at least on the comparing.

36 Claims, 10 Drawing Sheets

(56) References Cited

U.S. PATENT DOCUMENTS

| | | |
|---|---|---|
| 7,710,922 B2 | 5/2010 | Lundh et al. |
| 7,729,349 B2 | 6/2010 | Beckmann et al. |
| 7,864,722 B2 | 1/2011 | Yi et al. |
| 7,903,578 B2 | 3/2011 | Fischer |
| 7,944,943 B2 | 5/2011 | Kekki et al. |
| 7,961,704 B2 | 6/2011 | Meyer et al. |
| 8,068,497 B2 | 11/2011 | Terry et al. |
| 8,144,662 B2 | 3/2012 | Xing et al. |
| 2002/0021714 A1 | 2/2002 | Seguin |
| 2003/0129982 A1* | 7/2003 | Perini ............ 455/442 |
| 2003/0171118 A1 | 9/2003 | Miya |
| 2004/0224691 A1 | 11/2004 | Hadad |
| 2005/0044130 A1 | 2/2005 | Sillasto et al. |
| 2005/0074024 A1 | 4/2005 | Kim et al. |
| 2006/0203760 A1 | 9/2006 | Fukui et al. |
| 2006/0274712 A1 | 12/2006 | Malladi et al. |
| 2006/0276214 A1 | 12/2006 | Harris et al. |
| 2007/0008990 A1 | 1/2007 | Torsner |
| 2007/0104150 A1 | 5/2007 | Fernandez-Corbaton et al. |
| 2008/0069043 A1 | 3/2008 | Kimura et al. |
| 2008/0132263 A1 | 6/2008 | Yu et al. |
| 2008/0298322 A1 | 12/2008 | Chun et al. |
| 2009/0010213 A1 | 1/2009 | Yamada et al. |
| 2009/0036061 A1 | 2/2009 | Chun et al. |
| 2009/0103445 A1 | 4/2009 | Sammour et al. |
| 2009/0193310 A1 | 7/2009 | Hashimoto |
| 2009/0213729 A1 | 8/2009 | Zhang et al. |
| 2009/0219881 A1 | 9/2009 | Kim |
| 2009/0245178 A1 | 10/2009 | Gholmieh et al. |
| 2009/0245212 A1 | 10/2009 | Sambhwani et al. |
| 2009/0257387 A1 | 10/2009 | Gholmieh et al. |
| 2009/0270103 A1* | 10/2009 | Pani et al. ............ 455/436 |
| 2009/0296643 A1 | 12/2009 | Cave et al. |
| 2009/0296798 A1 | 12/2009 | Banna et al. |
| 2009/0300456 A1 | 12/2009 | Pelletier et al. |
| 2009/0323639 A1 | 12/2009 | Kim et al. |
| 2010/0034087 A1 | 2/2010 | De Benedittis et al. |
| 2010/0034114 A1 | 2/2010 | Kim et al. |
| 2010/0034169 A1 | 2/2010 | Maheshwari et al. |
| 2010/0034171 A1 | 2/2010 | Pelletier et al. |
| 2010/0034176 A1 | 2/2010 | Heo et al. |
| 2010/0067483 A1 | 3/2010 | Ahluwalia |
| 2010/0118723 A1 | 5/2010 | Pani et al. |
| 2010/0130137 A1 | 5/2010 | Pelletier et al. |
| 2010/0165830 A1 | 7/2010 | Amir et al. |
| 2010/0222059 A1 | 9/2010 | Pani et al. |
| 2010/0233962 A1 | 9/2010 | Johansson et al. |
| 2010/0238829 A1 | 9/2010 | Sambhwani et al. |
| 2010/0265883 A1 | 10/2010 | Attar et al. |
| 2010/0296511 A1 | 11/2010 | Prodan et al. |
| 2010/0303054 A1 | 12/2010 | Yang et al. |
| 2011/0038313 A1 | 2/2011 | Park et al. |
| 2011/0044168 A1 | 2/2011 | Nadas et al. |
| 2011/0044297 A1 | 2/2011 | Lee et al. |
| 2011/0122962 A1 | 5/2011 | De Pasquale et al. |
| 2011/0164560 A1 | 7/2011 | Ki et al. |
| 2011/0170495 A1 | 7/2011 | Earnshaw et al. |
| 2011/0222502 A1 | 9/2011 | Aminaka |
| 2011/0235519 A1 | 9/2011 | Racz et al. |
| 2011/0235528 A1 | 9/2011 | Racz et al. |
| 2011/0317642 A1 | 12/2011 | Eravelli et al. |
| 2011/0317657 A1 | 12/2011 | Chmiel et al. |
| 2012/0039169 A1 | 2/2012 | Susitaival et al. |
| 2012/0057560 A1 | 3/2012 | Park et al. |
| 2012/0082096 A1 | 4/2012 | Cave et al. |
| 2012/0163161 A1 | 6/2012 | Zhang et al. |
| 2012/0163205 A1 | 6/2012 | Zhang et al. |
| 2012/0163315 A1 | 6/2012 | Govindappa et al. |
| 2012/0163338 A1 | 6/2012 | Zhang et al. |
| 2012/0201219 A1 | 8/2012 | Wager et al. |
| 2012/0201226 A1 | 8/2012 | Sambhwani et al. |
| 2012/0281564 A1 | 11/2012 | Zhang et al. |
| 2012/0320867 A1 | 12/2012 | Sarkkinen et al. |
| 2013/0016841 A1 | 1/2013 | Fong et al. |
| 2013/0121247 A1 | 5/2013 | Seo et al. |
| 2013/0155923 A1 | 6/2013 | Yi et al. |
| 2013/0194924 A1 | 8/2013 | Zhang et al. |

FOREIGN PATENT DOCUMENTS

| | | |
|---|---|---|
| EP | 1672845 A1 | 6/2006 |
| EP | 1675426 A2 | 6/2006 |
| EP | 1868394 A1 | 12/2007 |
| EP | 1950903 A1 | 7/2008 |
| EP | 2015526 A2 | 1/2009 |
| JP | 2008053851 A | 3/2008 |
| JP | 2010028714 A | 2/2010 |
| JP | 2011525336 A | 9/2011 |
| WO | WO0230144 A1 | 4/2002 |
| WO | WO03017711 A1 | 2/2003 |
| WO | WO-2005041493 A1 | 5/2005 |
| WO | WO2006103136 A1 | 10/2006 |
| WO | WO2008097544 A2 | 8/2008 |
| WO | WO-2009108808 | 9/2009 |
| WO | WO2009155480 A1 | 12/2009 |
| WO | WO2010132186 A1 | 11/2010 |

OTHER PUBLICATIONS

Catt: "Implicit Feedback in Support of Downlink CoMP", 3GPP Draft; R1-093522, 3rd Generation Partnership Project (3GPP), Mobile Competence Centre ; 650, Route Des Lucioles ; F-06921 Sophia-Antipolis Cedex ; France, no. Shenzhen, China; 20090819,Aug. 19, 2009, XP050351782,[retrieved on Aug. 19, 2009] paragraphs 2.1 to 2.2.

Catt: "Measurement in CA", 3GPP Draft; R2-095485, 3rd Generation Partnership Project (3GPP), Mobile Competence Centre ; 650, Route Des Lucioles ; F-06921 Sophia-Antipolis Cedex ; France, no. Miyazaki; 20091012, Oct. 16, 2009, XP050390041, [retrieved on Oct. 4, 2009] paragraphs [02.2], [02.3].

Dong, Yu, et al: "A concurrent transmission control protocol," Communications, Circuits, and Systems Proceedings, 2006 International Conference on, IEEE, PI, Jun. 1, 2006, pp. 1796-1800, XP031010769, abstract, section II.

ETSI: "Digital cellular telecommunications system (Phase 2+),General Packet Radio Service (GPRS), Mobile Station (MS)—Base Station System (BSS) interface, Radio Link Control/ Medium Access Control (RLC/MAC) protocol (GSM 04.60 proposed version 1.1.0)", GSM 04.60, Feb. 19, 1998, pp. 48-51, XP000002657121, Retrieved from the Internet: URL:ww.etsi.org [retrieved on Aug. 18, 2011].

MCC Support: "Final Report of 3GPP TSG RAN WG1 #56bis v2.0.0 (Seoul, South Korea, Mar. 23, 27, 2009)",3GPP Draft; Final-ReportWG1#56B-V200, 3rd Generation Partnership Project (3GPP), Mobile Competence Centre ; 650, Route Des Lucioles ; F-06921 Sophia-Antipolis Cedex France, San Francisco, USA; 20090505, May 5, 2009, XP050339215,[ retrived on May 5, 2009] p. 11-p. 13-p. 14 p. 43-p. 44 p. 54-p. 55.

Nadas et al., "Providing Congestion Control in the Iub Transport Network for HSDPA," Global Telecommunications Conference 2007, Ericsson Research, GLOBECOM '07, IEEE, Nov. 26-30, 2007, 5 pages.

Nokia Siemens Networks et al: "Multi-cell transmission techniques for HSDPA", 3GPP Draft; R1-104913, 3rd Generation Partnership Project (3GPP), Mobile Competence Centre ; 650, Route Des Luci0les ; F-06921 Sophia-Antip0lis Cedex ; France, vol. RAN WG1, no. Madrid, Spain; 20100823, Aug. 17, 2010, XP050450059, [retrieved on Aug. 17, 2010] paragraphs [003.], [03.5], [04.1].

Qualcomm Europe: "TP for feedback in support of DL CoMP for LTEA TR", 3GPP Draft; R1-092290 TP for TR 36.814 on DL Comp Feedback, 3rd Generation Partnership Project (3GPP), Mobile Competence Centre ; 650, Route Des Lucioles ; F-06921 Sophia-Antipolis Cedex; France, no. San Francisco, USA; 20090609, Jun. 9, 2009 XP050339699, [retrieved on Jun. 9, 2009].

(56) References Cited

OTHER PUBLICATIONS

Qualcomm Incorporated: "DL Scheduling, RLC and Flow Control assumption for Inter-NodeB Multi-Point Transmissions", 3GPP Draft; R1-110126_DL_SCH_RLC_FLOW_CONTROL_ASS_INTER-NODEB_MP-HSDPA, 3rd Generation Partnership Project (3GPP), Mobile Competence Centre ; 650, Route Des Lucioles ; F-06921 Sophia-Antipolis Cedex ;France, vol. RAN WG1, no. Dublin, Ireland; 20110117, Jan. 11, 2011, XP050474375.

Qualcomm Incorporated: "On deploying DC-HSDPA UEs in Single Frequency Networks", R1-104157, 3rd Generation Partnership Project (3GPP), Mobile Competence Centre ; 650, Route Des Lucioles ; F-06921 Sophia-Antipolis Cedex ; France, vol. RAN-WG1, no. Dresden, Germany; 20100629 Jul. 5, 2010, XP002633072, Retrieved from the Internet: URL:http://www.3gpp.org/ftp/tsg_ran/WG1_RL 1/TSGR1_61b/Docs/R1-104157.zip [retrieved on Apr. 14, 2011].

Qualcomm Incorporated: "On Inter-site Multi-Point Transmission in HSDPA", 3GPP Draft; R2-115196 on Inter-Site Multi-Point Transmisston in HSDPA, 3rd Generation Partnership Project (3GPP) , Mobile Competence Centre ; 650, Route Des Lucioles ; F-06921 Sophia-Antipolis Cedex ; France, vol. RAN WG2, no. Zhuhai; 20111010, Oct. 4, 2011, XP050540985, [retrieved on Oct. 4, 2011] paragraphs [02.3] , [0003] figure 2; table 1.

Samsung: "Selection of primary scheduling Node B in SHO", 3GPP Draft; R1-040492, 3rd Generation Partnership Project (3GPP), Mobile Competence Centre ; 650, Route Des Lucioles ; F-06921 Sophia-Antipolis Cedex ; France, vol. RAN WG1, no. Montreal, Canada; 20040506, May 6, 2004, XP050098858.

Sharp, "Simultaneous Retransmission of Different Redundancy Versions during the HARQ for DL CoMP," 3GPP TSG-RAN WG1#58Bis, R1-094026, Miyazaki, Japan, Oct. 12-16, 2009, pp. 1-3.

Vulkan et al., "Congestion Control in Evolved HSPA Systems," 2011 IEEE 73rd Vehicular Technology Conference (VTC Spring), pp. 1-6.

David Soldani et al: "Strategies for Mobile Broadband Growth: Traffic Segmentation for Better Customer Experience", Vehicular Technology Conference (VTC Spring), 2011 IEEE 73rd, IEEE, May 15, 2011, pp. 1-5, XP031896606, DOI : 10.1109/VETECS.2011.5956203 ISBN: 978-1-4244-8332-7.

Ericsson: "Iub and Iur Congestion Control Concept for HSUPA and HSDPA", 3GPP Draft; R3-050545 Iubiur Cong Ctrl Disc, 3rd Generation Partnership Project (3GPP), Mobile Competence Centre ; 650, Route Des Lucioles ; F-06921 Sophia-Antipolis Cedex ; France, vol. RAN WG3, no. Athens, Greece; 20050504, May 4, 2005, XP050157970, [retrieved on May 4, 2005].

International Search Report and Written Opinion—PCT/US2012/049519—ISA/EPO—Oct. 19, 2012.

Nokia: "Number Of Control Symbols", 3GPP Draft; R2-071227 Number of Control Symbols, 3rd Generation Partnership Project (3GPP), Mobile Competence Centre ; 650, Route Des Lucioles ; F-06921 Sophia-Anti Polis Cedex ; France, vol. RAN WG2, no. S t . Juliana s, Malta; 20070326-200703, Mar. 22, 2007, XP050602966, [retrieved on Mar. 22, 2007].

Qualcomm Incorporated: "TCP Performance Evaluation of SF-DC Inter NodeB Aggregation Assuming Realistic RLC, Flow Control and Iub Congestions Control", 3GPP Draft; R1-112686_TCP_PERF_EVAL_SF_DC_INTER_NODEB_REALISTIC_RLC_FC_CC, 3rd Generation Partnership Project (3GPP), Mobile Competence Centre ; 650, Route Des Lucioles ; F-06921 Sophia-Antipolis Cedex ; France, vol. RAN WG1, no. Athens, Greece; 20110822, Aug. 16, 2011, XP050537724, [retrieved on Aug. 16, 2011].

Sandrasegaran K., et al., "Delay-Prioritized Scheduling (DPS) for Real Time Traffic in 3GPP LTE System", IEEE Wireless Communications and Networking Conference (WCNC), pp. 1-6, 2010.

Qualcomm Incorporated: "On deploying DC-HSDPA UEs in Single Frequency Networks", 3GPP TSG-RAN WG1#61b R1-103859, Jun. 21, 2010.

* cited by examiner

METHODS AND APPARATUSES FOR NETWORK CONFIGURATION OF USER EQUIPMENT COMMUNICATION MODES IN MULTIFLOW SYSTEMS

CLAIM OF PRIORITY UNDER 35 U.S.C. §119

The present application for patent claims priority to Provisional Application No. 61/514,858 entitled "Flow Control and Congestion Control for Multi-Point HSDPA" filed Aug. 3, 2011, and assigned to the assignee hereof and hereby expressly incorporated by reference herein. In addition, the present Application claims priority to Provisional Application No. 61/522,178 entitled "Flow Control and Congestion Control for Multi-Point WSDPA" filed Aug. 10, 2011, and assigned to the assignee hereof and hereby expressly incorporated by reference herein.

BACKGROUND

1. Field

Aspects of the present disclosure relate generally to wireless communication systems, and more particularly, to improving congestion in communication links between NodeBs and radio network controllers.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). The UMTS also supports enhanced 3G data communications protocols, such as High Speed Packet Access (HSPA) and High Speed Downlink Packet Access (HSDPA), which provide higher data transfer speeds and capacity to associated UMTS networks.

Furthermore, in some situations and in some systems, a UE may have the option of being served by (a) multiple carriers of a single cell (e.g. a serving cell) or (b) multiple cells utilizing a single carrier (e.g. a serving cell and a neighbor cell). Typically, the network determines the communication mode of the UEs under its control. In some examples, this determination will entail specifying which of communication modes (a) and (b), above, will be utilized by such a UE.

Both multi-cell and multi-carrier communication modes are currently utilized in modern wireless communication systems. For example, Dual-Carrier HSDPA (DC-HSDPA), which was standardized by the Third Generation Partnership Project (3GPP) for UMTS Release 8, allows a UE to be served by two carriers. Additionally, some multiflow wireless systems (e.g. UMTS Release 11) allow for Single-Frequency Dual-Cell HSDPA (SF-DC HSDPA or SF-DC), wherein a subject UE may be served by two cells in the same carrier or frequency. These two cells may reside at the same network entity (e.g. NodeB) or may reside at separate network entities.

Where both multi-cell, single-carrier and multi-carrier, single-cell UE communication modes are configured on a particular UE and the network is configured to communicate in such modes, the network must decide which mode that the UE should utilize. Methods and apparatuses for making such a determination have not been sufficiently described or discussed in the prior art. As the demand for mobile broadband access continues to increase, research and development continue to advance the UMTS technologies not only to meet the growing demand for mobile broadband access, but to advance and enhance the user experience with mobile communications. Thus, an improved method and apparatus for setting UE communication modes in multiflow wireless systems is needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Presented herein are methods and apparatuses for improved UE communication mode selection. For example, the present disclosure teaches a method of communication control at a radio network controller (RNC) in a multicarrier wireless network, which includes determining whether a user equipment UE is in at least one of a soft handover region and a softer handover region, and where the UE is in at least one of a soft handover region and a softer handover region, further includes predicting a future multi-cell performance of the UE assuming the UE will be served by a plurality of cells on a single carrier, predicting a future multi-carrier performance of the UE assuming the UE will be served by a plurality of carriers of a single cell, comparing the future multi-cell performance to the future multi-carrier performance, transmitting a mode command to the UE based at least on the comparing.

Further described herein is an example apparatus for wireless communication, including at least one processor and a memory coupled to the at least one processor, wherein the at least one processor is configured to determine whether a user equipment UE is in at least one of a soft handover region and a softer handover region, and where the UE is in at least one of a soft handover region and a softer handover region, the at least one processor is further configured to predict a future multi-cell performance of the UE assuming the UE will be served by a plurality of cells on a single carrier, predict a future multi-carrier performance of the UE assuming the UE will be served by a plurality of carriers of a single cell, compare the future multi-cell performance to the future multi-carrier performance, and transmit a mode command to the UE based at least on the comparing.

Additionally provided herein is a computer-readable medium comprising code for determining whether a user equipment UE is in at least one of a soft handover region and a softer handover region, and where the UE is in at least one of a soft handover region and a softer handover region, further comprising code for predicting a future multi-cell performance of the UE assuming the UE will be served by a plurality of cells on a single carrier, predicting a future multi-carrier performance of the UE assuming the UE will be served by a plurality of carriers of a single cell, comparing the future multi-cell performance to the future multi-carrier performance, and transmitting a mode command to the UE based at least on the comparing.

In addition, the present disclosure describes an apparatus for wireless communication in a multicarrier wireless network, which includes means for determining whether a user equipment UE is in at least one of a soft handover region and a softer handover region, and where the UE is in at least one of a soft handover region and a softer handover region, further includes means for predicting a future multi-cell performance of the UE assuming the UE will be served by a plurality of cells on a single carrier, means for predicting a future multi-carrier performance of the UE assuming the UE will be served by a plurality of carriers of a single cell, means for comparing the future multi-cell performance to the future multi-carrier performance, and means for transmitting a mode command to the UE based at least on the comparing.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure provides methods and apparatuses for improved UE communication mode determination in a multiflow wireless system by a network entity, such as, but not limited to, a radio network controller (RNC). For example, an RNC may predict a future multi-cell and a future multi-carrier UE performance, may compare these predicted future performances, and may command a UE to communicate via a particular mode based on this comparison.

Figure 1:
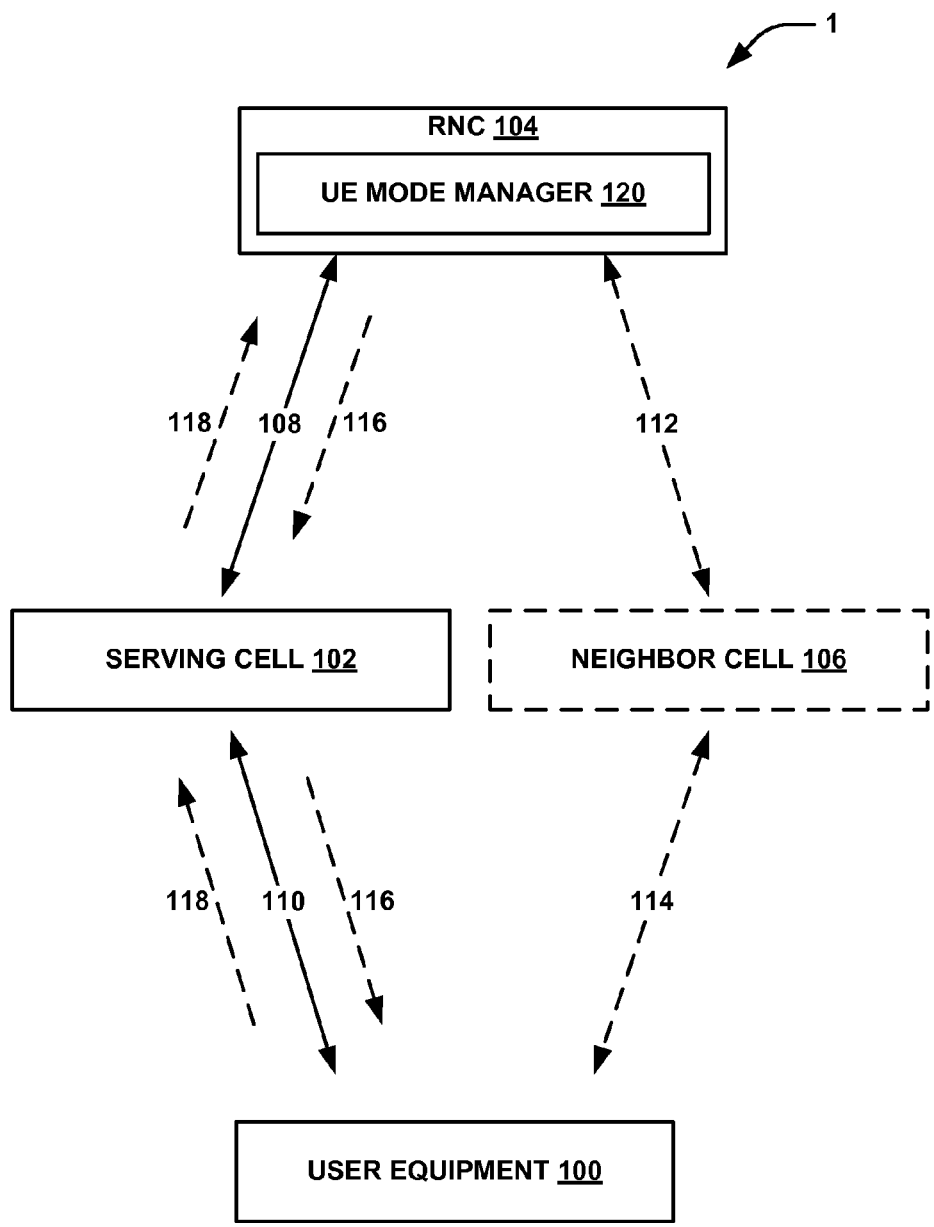
FIG. 1 is a block diagram illustrating an example multiflow wireless system of aspects of the present disclosure.

Referring to FIG. 1, a multilink wireless communication system 1 is illustrated that facilitates improved communication mode selection for UEs in a multiflow (e.g. multi-carrier and/or multi-cell) wireless communications system 1. System 1 includes one or more user equipment (UE) 100 that may communicate with one or more of a serving cell 102 and/or one or more optional neighbor cells 106 via one or more over-the-air links 110 and/or 114, respectively. In an aspect, communication links 110 and/or 114 may carry a downlink flow of data originating from a radio network controller (RNC) 104 and routed to UE 100 by a serving cell 102 and/or neighbor cell 106. Furthermore, as system 1 may represent a multiflow wireless system, UE 100 may be served by a plurality of cells—for example, serving cell 102 and neighbor cell 106—and may therefore receive data via both communication links 110 and 114. Additionally, communication links 110 and 114 may transmit portions of the same data message to UE 100. For example, RNC 104 may generate and/or receive a message comprised of one or more larger data packets (e.g., service data units (SDUs)) and deconstruct the one or more larger data packets into one or more smaller data packets (e.g., protocol data units (PDUs)).

In an aspect of multiflow wireless system 1, one or more of these smaller data packets may be transmitted to UE 100 via serving cell 102 while one or more of the smaller data packets may be transmitted to UE 100 via neighbor cell 106. In such an example, communication link 110 and communication link 114 may comprise a communication link of the same frequency, or "carrier." Thus, such operation may comprise a single-frequency, dual-cell (SF-DC) arrangement.

Alternatively or additionally, communication link 110 may contain multiple independent carriers, such as a carrier at a first frequency and a carrier at a second frequency. Thus, UE 100 may communicate with serving cell 102 via multiple carriers in the same cell, which may be referred to as dual carrier (DC) or multi-carrier (MC) operation on a single serving cell. Additionally, regardless of the data path traversed by the smaller data packets, the UE 100 may reconstruct the original message.

The UE 100 of system 1 may be configured to request data from a network component, such as, but not limited to, serving cell 102 or neighbor cell 106, by generating and transmitting one or more data requests to serving cell 102 or neighbor cell 106. Furthermore, UE 100 may be configured to receive data from a network (e.g., network entities, NodeBs, and/or RNC 104) via multiple flows, communication links, or carriers. In a further aspect of the present disclosure, UE 100 may transmit one or more measurement reports 118 to serving cell 102 and/or RNC 104, which may inform these one or more network entities of signal conditions in wireless system 1.

According to an additional aspect, one or more or serving cell 102 and neighbor cell 106 may be serviced by one or multiple network entities, such as NodeBs, of system 1. As such, in some examples, serving cell 102 and neighbor cell 106 may share a network entity or may be served by independent network entities. In an aspect, these network entities may include one or more of any type of network component, such as an access point, including a base station (BS) or NodeB, a relay, a peer-to-peer device, an authentication, authorization and accounting (AAA) server, a mobile switching center (MSC), etc., that can enable UE 100 to communicate and/or that can establish and maintain communication links 102 and/or 106. In addition, in system 1, the one or more network entities may be in communicative contact with RNC 104 via one or more backhaul communication links, such as Iub links 112 and/or 108.

In addition, RNC 104 may include a UE mode manager 120, which may be configured to assign a communication mode to a UE and command the UE to communicate in wireless system 1 via the assigned communication mode. In an aspect, this assignment may be based on determining whether a multi-cell or multi-carrier communication mode would be more beneficial for overall UE communication performance, link integrity, user experience, or the like. For example, in some scenarios, UE mode manager 120 may determine that a UE 100 is in a soft or softer handover region and may therefore be served by multiple cells on a single carrier or may alternatively be served by a single cell on multiple carriers. Based on this determination, the UE mode manager may predict a future multi-cell performance were the UE to be served by both serving cell 102 and neighbor cell 106 via the single carrier, and may also predict a future multi-carrier performance were the UE to be served by the serving cell 102 via multiple carriers. Based on comparing the future multi-cell performance and the future multi-carrier performance, the UE mode manager may transmit a mode command 116 to the UE 100, which the UE 100 may follow to establish a communication mode for communicate with one or more network entities of wireless system 1.

Figure 2:
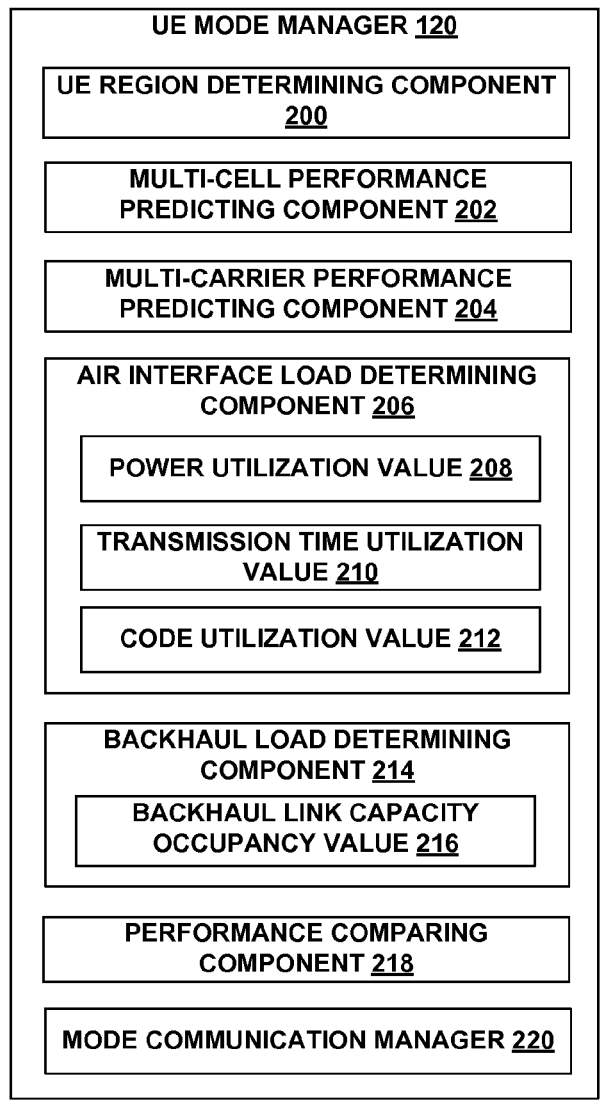
FIG. 2 is a block diagram illustrating an example UE mode manager according to aspects of the present disclosure.

FIG. 2 represents an example UE mode manager 120 of the present disclosure, which may be configured to determine a communication mode in which one or more UEs associated with an RNC may be commanded to operate. For example, in some aspects, UE mode manager 120 may command a UE to communicate with a single cell via multiple cells or may command the UE to communicate with multiple cells (e.g. a serving and neighbor cell) via a single carrier.

In an aspect, UE mode manager 120 may include a UE region determining component 200, which may determine whether the UE is in a soft or softer handover region. In other words, UE region determining component 200 may determine whether multi-cell communication is possible for the UE. As used herein, the term "soft handover region" refers to a region in which the UE is capable of simultaneous communication with two separate cells serviced by different access points (e.g., NodeBs) and the term "softer handover region" refers to a region in which a UE is capable of simultaneous communications with two separate cells serviced by a common access point. To make such a determination, UE region determining component 200 may receive one or more measurement reports from the UE, and may analyze the one or more measurement reports to determine whether the UE is able to communicate with multiple cells, such as a currently-serving cell and a neighbor cell or candidate cell. In a non-limiting example, UE region determining component may compare a signal strength associated with the one or more cells measured in the received measurement report against a candidate threshold signal strength value to determine whether a neighbor or candidate cell of reference has an associated signal strength that is strong enough to warrant a determination that the UE is in a soft or softer handover region. In an aspect, where multi-cell communication is not possible—such as where UE region determining component 200 determines that the subject UE is not in a soft or softer handover region—mode communication manager 220 may command the UE to communicate with the network via one or multiple carriers on a single cell, which may be a cell currently serving the UE.

Furthermore, UE mode manager 120 may include a multi-cell performance predicting component 212, which may be configured to predict a communication performance of the UE were the UE to be commanded to communicate via a single carrier on multiple cells. Furthermore, in an additional or alternative aspect, UE mode manager 120 may include a multi-carrier performance predicting component 204, which may be configured to predict a communication performance of the UE were the UE to be commanded to communicate via multiple carriers in a single cell. In an aspect, multi-cell performance predicting component 202 and/or multi-carrier performance predicting component 204 may determine its prediction as a function of one or both of an air interface load and/or a backhaul load associated with the UE, a network entity, and/or the RNC.

In an aspect, to determine the air interface load, the UE mode manager 120 may include an air interface load determining component 206. According to some non-limiting examples, air interface load determining component 206 may determine an air interface load based on calculating, receiving from a UE or a network component, or otherwise obtaining a power utilization value 208, transmission time utilization value 210, a channel quality indicator (CQI), and/or a code utilization value 212 of current or past transmissions on an air-interface link between the UE and a serving cell network entity or a neighbor cell network entity.

For purposes of the present disclosure, the power utilization value 208 may be a percentage or ratio of average transmission power used by a cell to its maximum transmission power over the air interface. In an aspect, where the power utilization value 208 is low, the cell is lightly loaded and the UE could be served with a relatively high amount of power. Alternatively, where the power utilization power 208 is relatively high, less power is available to serve the UE. Thus, a low power utilization value 208 may serve as an indication of the lightly loaded air interface link between the UE and the subject network entity—which may be either the serving cell network entity or neighbor cell network entity depending on which air interface the air interface load determining component is analyzing.

In addition, for purposes of the present disclosure, the transmission time utilization value 210 may refer to a percentage or ratio of the utilized transmission time on average to the total time at a serving or neighbor cell. Where the transmission time utilization value 210 is high, for example, a UE may be served by only a small amount of time. Alternatively, where the transmission time utilization value 210 is low, a UE may be served by a large amount of time. Thus, the transmission time utilization value 210 may be an indicator of the loading of the air interface between a UE and a network entity, such as a network entity associated with a serving cell or a candidate neighbor cell.

Furthermore, for purposes of the present disclosure, the code utilization value 212 may refer to a number of unique channelization, or other codes assigned to all the UEs served by a particular cell and in use at a particular time. For example, an RNC may query a base station as to how many unique scrambling codes have been assigned and are currently in use by UEs served by the cell, which may serve as the code utilization value 212 associated with the cell (e.g. the serving cell or a neighbor cell). Where the code utilization value 212 is high, a relatively high number of unique scrambling (or channelization, etc.) codes may be in use by the cell, which may correspond to a relatively high number of UEs in a set of UEs being served by the cell. Thus, because the number of UEs being served by the cell is high, the air interface between the network entity serving the cell and the UEs may be particularly highly loaded. This may cause interference, decreased throughput, or other negative communication characteristics were the subject UE to be added to the set of UEs.

In an additional aspect, a CQI associated with the air interface (i.e. one or more communication channels associated with the air interface) may be utilized to predict the air interface load. In an aspect, this CQI may be calculated by the UE assuming a nominal amount of transmission power indicated by the cell. In addition, in some examples of performance prediction, the RNC may assume that the serving or neighbor cell of note will use the same amount of power to serve the UE.

Furthermore, to determine the backhaul load, UE mode manager 120 may include a backhaul load determining component 214. According to some non-limiting examples, backhaul load determining component 214 may determine a backhaul (e.g. Iub link) load based on calculating, receiving from a UE or a network component, or otherwise obtaining a backhaul link capacity occupancy value 216. For purposes of the present disclosure, the backhaul link capacity occupancy value 116 may be determined by the RNC obtaining (e.g. measuring or receiving a measurement report) an amount of data being transmitted on the Iub link or the percentage of time required to transmit all the packets of data from the RNC to the subject network entity over the Iub link. Alternatively or additionally, the backhaul link capacity occupancy value 116 may be a function of the number of packets transmitted and/or received over the Iub link during a given time period, which may be measured and/or communicated to the RNC by the network entity. Furthermore, the backhaul link capacity occupancy value 216 may comprise an indication as to whether an Iub link is in a congested state. For example, in a non-limiting aspect, the RNC or each network entity may store a congested state threshold, which may be a threshold value related to Iub data packet transmission time or data load. Where this threshold is equaled or surpassed based on RNC or network entity Iub measurements, the RNC may declare that the Iub is in a congested state, which may be reflected in the backhaul link capacity occupancy value 216 or otherwise may signal that the UE should not utilize the network entity associated with the Iub in the congested state. In an additional aspect, a backhaul time utilization value may be used for backhaul load prediction. For purposes of the present disclosure, the backhaul time utilization value may be a ratio or percentage of the amount of non-transmission time to total time in a particular transmission time period. Thus, these and other parameters and/or Iub states may provide the RNC with information as to the current communication conditions on each Iub link, which may be used to predict the future backhaul load were the UE to be added to the network entity load.

As stated above, the multi-cell performance predicting component 202 and/or multi-carrier performance predicting component 204 may determine its prediction as a function of one or both of an air interface load and/or a backhaul load associated with the UE, a network entity, and/or the RNC. In a non-limiting example, an RNC may weight one or more of the backhaul load and the air interface load, or the related power utilization value 208 (PU), transmission time utilization value 210 (TTU), code utilization value 212 (CU), a channel quality indicator, and backhaul link capacity occupancy value 116 (BLCO) to arrive at a predicted performance of the UE under multi-cell or multi-carrier conditions. In a non-limiting example, the future multi-carrier performance ($P_{m\text{-}carrier}$) of a UE may be computed as a function of the air interface load of a first carrier (c1) and a second carrier (c2) of a serving cell as well as the backhaul load of the serving cell-RNC Iub link, each multiplied by configurable constants ($k_1$-$k_7$) as follows:

$$P_{m\text{-}carrier} = f(k_1 PU_{c1}, k_2 TTU_{c1}, k_3 CU_{c1}, k_4 PU_{c2}, k_5 TTU_{c2}, k_6 CU_{c2}, k_7 BLCO)$$

Alternatively, where the air interface associated with the second carrier of the serving cell cannot be measured, the RNC may assume that the parameters associated with the second carrier will be comparable to those of a measureable first carrier, and may therefore utilize the air interface parameters for both carriers, as follows:

$$P_{m\text{-}carrier} = f(k_1 PU_{c1}, k_2 TTU_{c1}, k_3 CU_{c1}, k_4 PU_{c1}, k_5 TTU_{c1}, k_6 CU_{c1}, k_7 BLCO)$$

In a further non-limiting example, the future multi-cell performance may be computed as a function of the air interface load associated with the UE and a first cell (e.g. the serving cell, s) and a second cell (e.g. the neighbor cell, n) on a carrier a, and first and second backhaul loads associated with the RNC and the first cell and second cell, respectively, each multiplied by configurable constants ($k_1$-$k_5$). Thus, the multi-cell performance ($P_{m\text{-}cell}$) may be represented as follows:

$$P_{m\text{-}cell} = f(k_1 PU_a, k_2 TTU_a, k_3 CU_a, k_4 BLCO_s, k_5 BLCO_n)$$

As such, the future multi-carrier and multi-cell performances may be determined for a UE based on at least an air interface load and backhaul load associated with the UE, network entities, and an RNC.

In some additional non-limiting examples, a UE in a wireless system may detect two cells, Cell 1 and Cell 2. In an aspect, both cells may be configured to communicate via at least two carrier frequencies or carriers, such as F1 and F2. In such an example, the RNC associated with Cell 1, Cell 2, and/or the UE may choose to assign the UE a communication mode from the following non-limiting possibilities:

Multi-carrier, single carrier mode: $(C1,F1)+(C1,F2)$ (a)

Multi-cell, single carrier mode: $(C1,F1)+(C2,F1)$. (b)

In these example, the mutual interference in serving the UE by (C1, F1)+(C2, F1) may be ignored and the RNC may sum the data rates as an approximation of future performance. As such, in these examples, the performance $P_{(C1,F1)}$ of serving the UE only from (C1, F1) may be predicted according to the following:

$$P_{(C1,F1)} = \min\{(1 - OTA\text{TimeUtilization}(C1,F1)) \times \text{DataRateCQI}, (C1,F1), (1 - \text{BackhaulTimeUtilization}C1) \times \text{BackhaulCapacity}C1\}$$

Likewise, throughput $P_{(C1,F1)}$ of serving the UE only from (C1, F2) may be predicted according to the following:

$$P_{(C1,F1)} = \min\{(1 - OTA\text{TimeUtilization}(C1,F2)) \times \text{DataRateCQI}(C1,F2), (1 - \text{BackhaulTimeUtilization}C1) \times \text{BackhaulCapacity}C1\}$$

Furthermore, the throughput $P_{(C1,F1)}$ of serving the UE only from (C2, F1) may be predicted according to:

$$P_{(C1,F1)} = \min\{(1 - OTA\text{TimeUtilization}(C2,F1)) \times \text{DataRateCQI}, (C2,F1), (1 - \text{BackhaulTimeUtilization}C2) \times \text{BackhaulCapacity}C2\}.$$

In addition, where the RNC computes a predicted throughput for serving the UE by (C1, F1) and (C1, F2), the RNC may sum each of the carrier frequency throughputs or data rates over the air, but the backhaul limitation will remain the same.

Namely, the RNC may predict the throughput of the multi-carrier, single cell communication mode (C1, F1)+(C1, F2) as:

$$P_{(C1,F1)+(C1,F2)} = \min\{(1-OTA\text{TimeUtilization}(C1,F1)) \times \text{DataRateCQI}(C1,F1) + (1-OTA\text{TimeUtilization}(C1,F2)) \times \text{DataRateCQI}(C1,F2), (1-\text{BackhaulTimeUtilization}C1) \times \text{BackhaulCapacity}C1\}.$$

Furthermore, when predicting serving the UE by multiple cells on a single carrier, e.g. (C1, F1) and (C2, F1), assuming no mutual interference between the two cells, the data rate over the air can be added up, and the backhaul limitation can be added, as well. Namely, the throughput $P_{(C1,F1)+(C2,F1)}$ of (C1, F1)+(C1, F2) may be predicted according to:

$$P(C1,F1)+(C2,F1) = \min\{(1-OTA\text{TimeUtilization}(C1,F1)) \times \text{DataRateCQI}(C1,F1), \text{BackhaulTimeUtilization}C1 \times \text{BackhaulCapacity}C1\} + \min\{(1-OTA\text{TimeUtilization}(C2,F1)) \times \text{DataRateCQI}(C2,F1), \text{BackhaulTimeUtilization}C2 \times \text{BackhaulCapacity}C2\}.$$

In an aspect, the CQI-based data rates for (C1, F1) may decrease, to a small extent, if the UE is served on (C2, F1) due to increased inter-cell interference. However, the total throughput from (C1, F1) and (C2, F1) may be higher than from (C1, F1) alone. Such a decrease in the data rate in (C1, F1) is ignored in the above example for the sake of simplicity. However, if such dependence is considered, predicted performance $P_{(C1,F1)+(C2,F1)}$ may be represented as and/or computed according to:

$$R(C1,F1)+(C2,F1) = \min\{(1-OTA\text{TimeUtilization}(C1,F1))*\text{DataRate'CQI}(C1,F1), \text{BackhaulTimeUtilization}C1*\text{BackhaulCapacity}C1\} + \min\{(1-OTA\text{TimeUtilization}(C2,F1))*\text{DataRate-CQI}(C2,F1), \text{BackhaulTimeUtilization}C2*\text{BackhaulCapacity}C2\},$$

where $\text{DataRate'}_{CQI,(C1,F1)}$ is the data rate based on CQI for (C1, F1) when the UE is also served by (C2, F1). In an aspect, $\text{DataRate'}_{CQI,(C1,F1)}$ can be estimated from the Data $\text{Rate'}_{CQI,(C1,F1)}$.

Additionally, in an aspect, UE mode manager 120 may further include a performance comparing component 218, which may be configured to compare a multi-cell performance prediction obtained from multi-cell performance predicting component 202 to a multi-carrier performance prediction obtained from multi-carrier performance predicting component 204. This comparison may be a one-to-one comparison between the determined multi-cell and multi-carrier performance values or may involve weighting one or both of the multi-cell and multi-carrier performance values to determine which mode of communication would be most advantageous to the network load, user experience, or the like, associated with the subject UE.

In an alternative or additional aspect, the performance comparing component 218 may compare or analyze specific aspects of a potential multi-cell or potential multi-carrier mode for a particular UE. For example, based on the determined air interface load associated with the UE, the RNC may determine that a neighbor cell is not more heavily loaded (e.g. exhibits more favorable air interface characteristics) than a serving cell currently serving the UE and/or may determine that a backhaul link associated with the neighbor cell is not in a congested state. Based on one or more such comparisons or analyses, the RNC may determine that the UE should operate in a multi-cell (e.g. single carrier) communication mode. In an additional non-limiting example, the RNC may determine that a neighbor cell is similarly or more heavily loaded (e.g. exhibits similar or less favorable air interface characteristics) than a serving cell currently serving the UE and/or may determine that a backhaul link associated with the serving cell is not in a congested state. Again, based on these or similar comparisons or analyses, the RNC may determine that the UE should operate in a multi-carrier (e.g. single cell) communication mode. Such ultimate communication mode determinations may be made by a mode communication manager 220, which may be configured to generate or otherwise obtain a mode determination associated with the UE and transmit a mode command to the UE, which may command the UE to operate in a certain communication mode. In an aspect, this communication mode may be one of a multi-carrier or multi-cell communication mode and may be based on the comparison of the future performance of the UE in each of these modes by performance comparing component 218. As a result, the subject UE may operate in the commanded communication mode for optimized communication performance and user experience.

Figure 3:
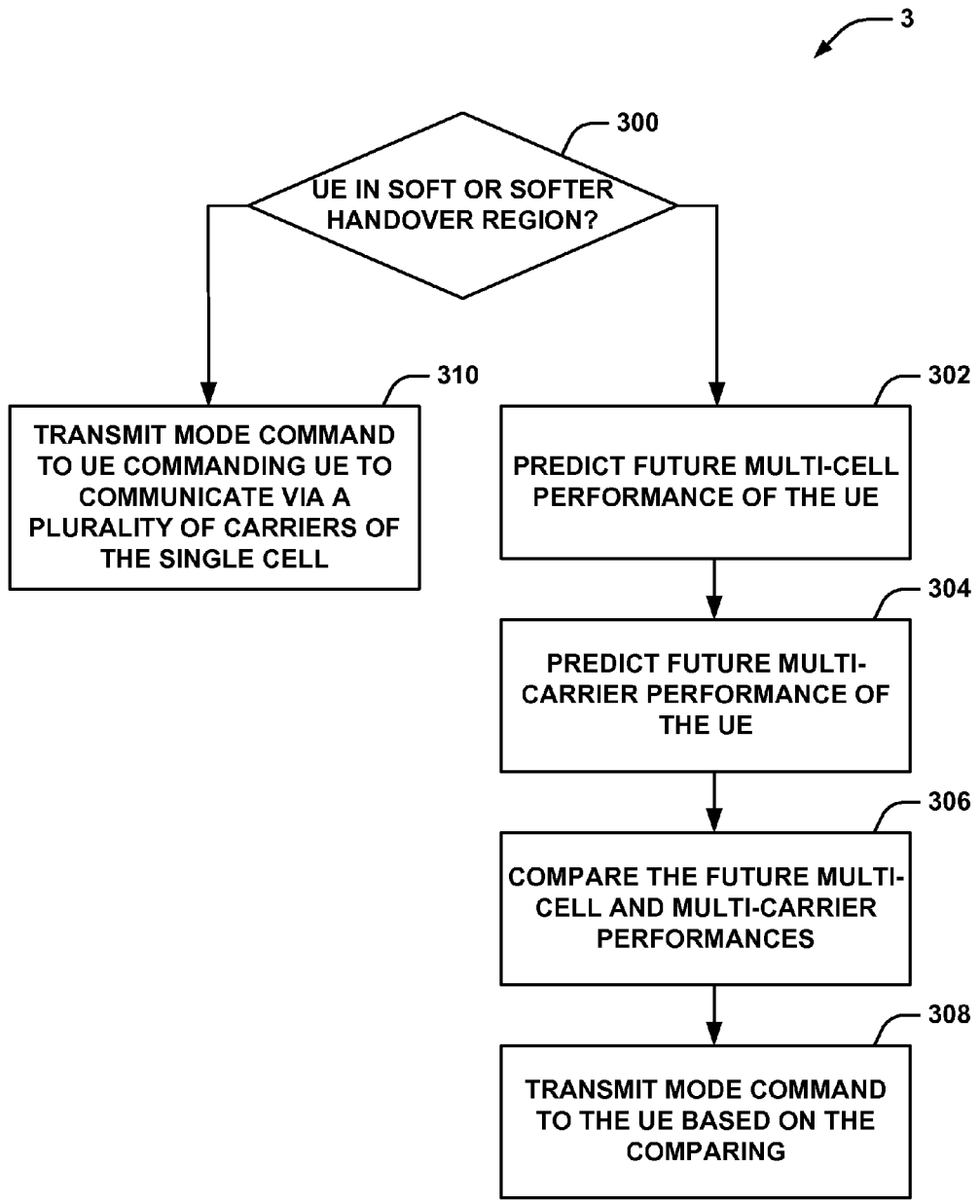
FIG. 3 is a flow diagram illustrating aspects of a method for supporting improved UE communication mode control in a multilink wireless environment as provided by the present disclosure.

FIG. 3 presents a sample methodology 3 for optimizing a UE communication mode in a multi-cell- and/or multi-carrier-capable wireless communications system according to aspects of the present disclosure. In an aspect, at block 300, a radio network controller (RNC) or other network entity may determine whether a subject UE is in a soft or softer handover region. According to some examples, this determination may be made based upon one or more measurement reports received from the UE, which may include signal strengths or other parameters associated with signals (e.g. pilot signals, beacon signals) received at the UE from one or more network entities (e.g. serving cells or neighbor cells or associated NodeBs or base stations). For example, the RNC may receive and analyze the received one or more measurement reports to determine whether a serving cell and at least one neighbor cell have signal strengths above a predetermined threshold, and where this threshold is exceeded, may determine that the UE is in a soft or softer handover region. Where the RNC determines that the UE is not in a soft or softer handover region, the RNC may transmit a mode command to the UE at block 310, which may command the UE to communicate with the network via a plurality of carriers associated with a single cell (e.g. the serving cell).

Alternatively, where the RNC determines that the UE is in a soft or softer handover region, at block 302 the RNC may predict a future multi-cell performance of the UE were the UE to be served by multiple cells on a single frequency or carrier, for example. Furthermore, at block 304, the UE may predict a future multi-carrier performance of the UE were the UE to be served by multiple channels of a single cell, for example. In an aspect, the predictions of blocks 302 and/or 304 may be based on an air interface load and/or a backhaul load. In an aspect, the air interface load may be computed or otherwise obtained as a function of power utilization, transmission time utilization, or code utilization associated with a cell and/or a UE, as non-limiting examples. Furthermore, the backhaul load may be calculated or otherwise obtained as a function of a backhaul link capacity occupancy value associated with one or more Iub links between a serving cell network entity and an RNC or between a neighbor cell network entity and an RNC.

In an additional aspect, at block 306, the RNC may compare the predicted future multi-cell and multi-carrier performances from blocks 302 and/or 304. Additionally, based on this comparison, the RNC may transmit a mode command to the UE at block 308. In a non-limiting example, the mode command may instruct the UE to communicate with the network according to the most advantageous communication mode determined by the comparing at block 306. As such, example methodology 3 may optimize UE-network communication in wireless systems configured for multi-carrier and/or multi-cell (e.g. multilink) communication.

Figure 4:
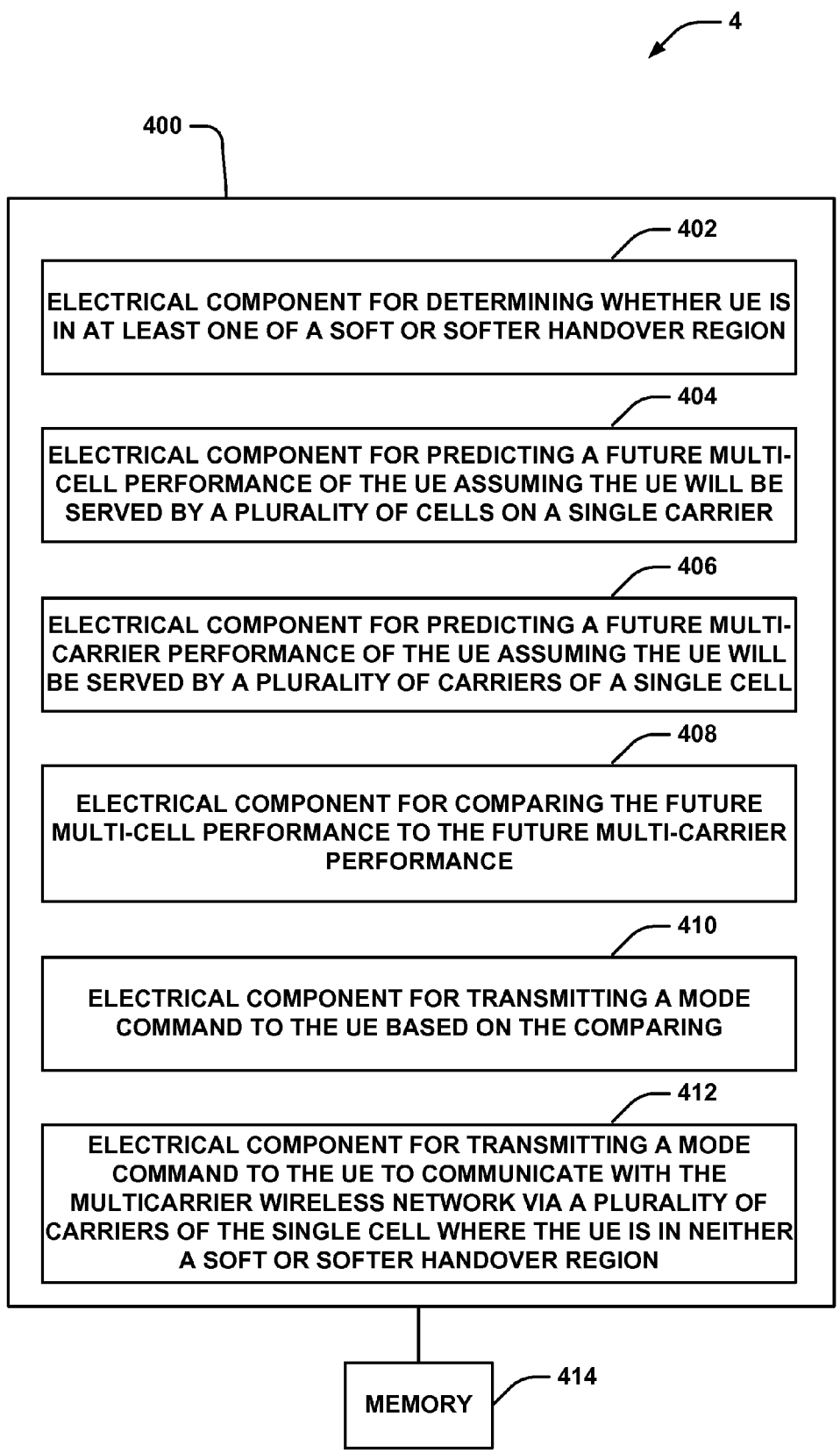
FIG. 4 is a component diagram illustrating aspects of a logical grouping of electrical components as contemplated by the present disclosure.

Referring to FIG. 4, an example system 4 is displayed for improved UE communication mode management in multi-link wireless environments. For example, system 4 can reside at least partially within one or more network entities. It is to be appreciated that system 4 is represented as including functional blocks, which can be functional blocks that represent functions implemented by a processor, software, or combination thereof (e.g., firmware). System 4 includes a logical grouping 400 of electrical components that can act in conjunction. For instance, logical grouping 400 can include an electrical component 402 for determining whether a UE is in at least one of a soft or softer handover region. In an aspect, electrical component 402 may comprise UE region determining component 200 (FIG. 2). Additionally, logical grouping 400 can include an electrical component 404 for predicting a future multi-cell performance by the UE assuming the UE will be served by a plurality of cells on a single carrier. In an aspect, electrical component 404 may comprise multi-cell performance predicting component 202 (FIG. 2). In an additional aspect, logical grouping 400 can include an electrical component 406 predicting a future multi-carrier performance of the UE assuming the UE will be served by a plurality of carriers of a single cell. In an aspect, electrical component 406 may comprise multi-carrier performance predicting component 204 (FIG. 2). Furthermore, logical grouping 400 can include an electrical component 408 for comparing the future multi-cell performance to the future multi-carrier performance. In an aspect, electrical component 408 may comprise performance comparing component 218 (FIG. 2). In an additional aspect, logical grouping 400 can include an electrical component 410 for transmitting a mode command to the UE based on the comparing. In an aspect, electrical component 410 may comprise mode communication manager 220 (FIG. 2). Additionally, logical grouping 400 can include an optional electrical component 412 for transmitting a mode command to the UE to communicate with the multicarrier wireless network via a plurality of carriers of a single cell where the UE is in neither a soft or softer handover region. In an aspect, electrical component 412 may comprise mode communication manager 220 (FIG. 2).

Additionally, system 4 can include a memory 414 that retains instructions for executing functions associated with the electrical components 402, 404, 406, 408, 410, and 412, stores data used or obtained by the electrical components 402, 404, 406, 408, 410, and 412, etc. While shown as being external to memory 414, it is to be understood that one or more of the electrical components 402, 404, 406, 408, 410, and 412 can exist within memory 414. In one example, electrical components 402, 404, 406, 408, 410, and 412 can comprise at least one processor, or each electrical component 402, 404, 406, 408, 410, and 412 can be a corresponding module of at least one processor. Moreover, in an additional or alternative example, electrical components 402, 404, 406, 408, 410, and 412 can be a computer program product including a computer readable medium, where each electrical component 402, 404, 406, 408, 410, and 412 can be corresponding code.

Figure 5:
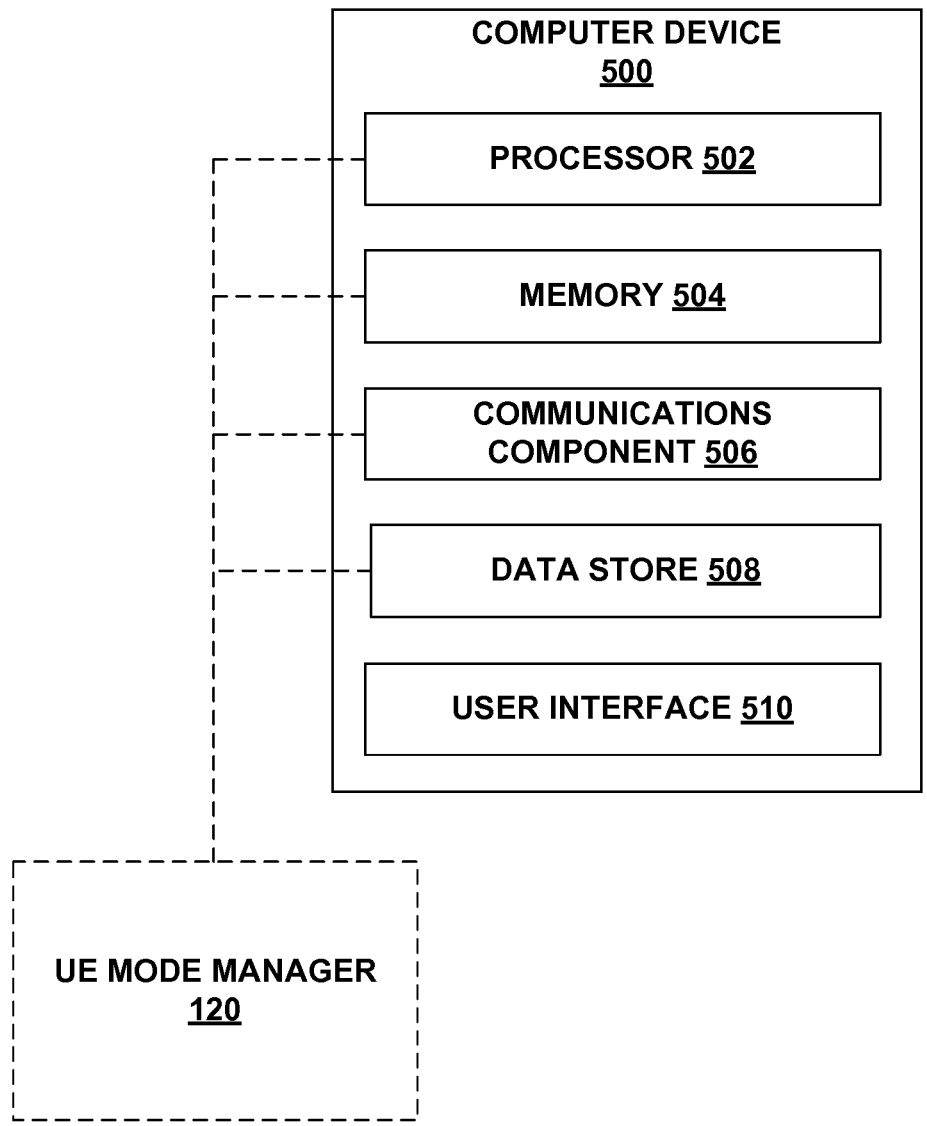
FIG. 5 is a block diagram illustrating aspects of a computer device according to the present disclosure.

Referring to FIG. 5, in one aspect, any of UE 100, or the one or more network entities of cells 102 and/or 106, or RNC 104 (FIG. 1) may be represented by a specially programmed or configured computer device 500. Computer device 500 includes a processor 502 for carrying out processing functions associated with one or more of components and functions described herein. Processor 502 can include a single or multiple set of processors or multi-core processors. Moreover, processor 502 can be implemented as an integrated processing system and/or a distributed processing system.

Computer device 500 further includes a memory 504, such as for storing data used herein and/or local versions of applications being executed by processor 502. Memory 504 can include any type of memory usable by a computer, such as random access memory (RAM), read only memory (ROM), tapes, magnetic discs, optical discs, volatile memory, non-volatile memory, and any combination thereof.

Further, computer device 500 includes a communications component 506 that provides for establishing and maintaining communications with one or more parties utilizing hardware, software, and services as described herein. Communications component 506 may carry communications between components on computer device 500, as well as between computer device 500 and external devices, such as devices located across a communications network and/or devices serially or locally connected to computer device 500. For example, communications component 506 may include one or more buses (e.g., a bus connecting processor 502, memory 504, data store 508 and/or user interface 510), and may further include transmit chain components and receive chain components associated with a transmitter and receiver, respectively, or a transceiver, operable for interfacing with external devices (e.g., access points, RNC, and/or UE). In an additional aspect, communications component 506 may be configured to receive one or more pages from one or more subscriber networks. In a further aspect, such a page may correspond to the second subscription and may be received via the first technology type communication services.

Additionally, computer device 500 may further include a data store 508, which can be any suitable combination of hardware and/or software, that provides for mass storage of information, databases, and programs employed in connection with aspects described herein. For example, data store 508 may be a data repository for applications not currently being executed by processor 502. For example, in an embodiment data store 508 may comprise non-volatile memory, such as, for example, magnetic storage, optical storage, flash memory (solid state storage), etc.

Computer device 500 may additionally include a user interface component 510 operable to receive inputs from a user of computer device 500, and further operable to generate outputs for presentation to the user. User interface component 510 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

In addition, in a network controller or RNC, such as for RNC 104 of FIG. 1, computer device 500 may include UE mode manager 120, such as in specially programmed computer readable instructions or code, firmware, hardware, or some combination thereof. For example, as illustrated in FIG. 5, UE Mode Manager 120 (FIG. 2) may be implemented by a combination of one or more of processor 502, memory 504, communications component 506 and/or data store 506. As an example, code for implementing the various components illustrated in FIG. 2 may be stored by data store 508 and then retrieved and executed by processor 502 with data such as values 208, 210, 212, 216, and 218 stored in memory 504. Further, in this example, communications component 506 may be used by mode communications manager 220 (executed by processor) in communicating with an access point(s) servicing cells 102 and 106. It should be noted that this is but one illustrative exemplary implementation of UE Mode Manager 120.

Figure 6:
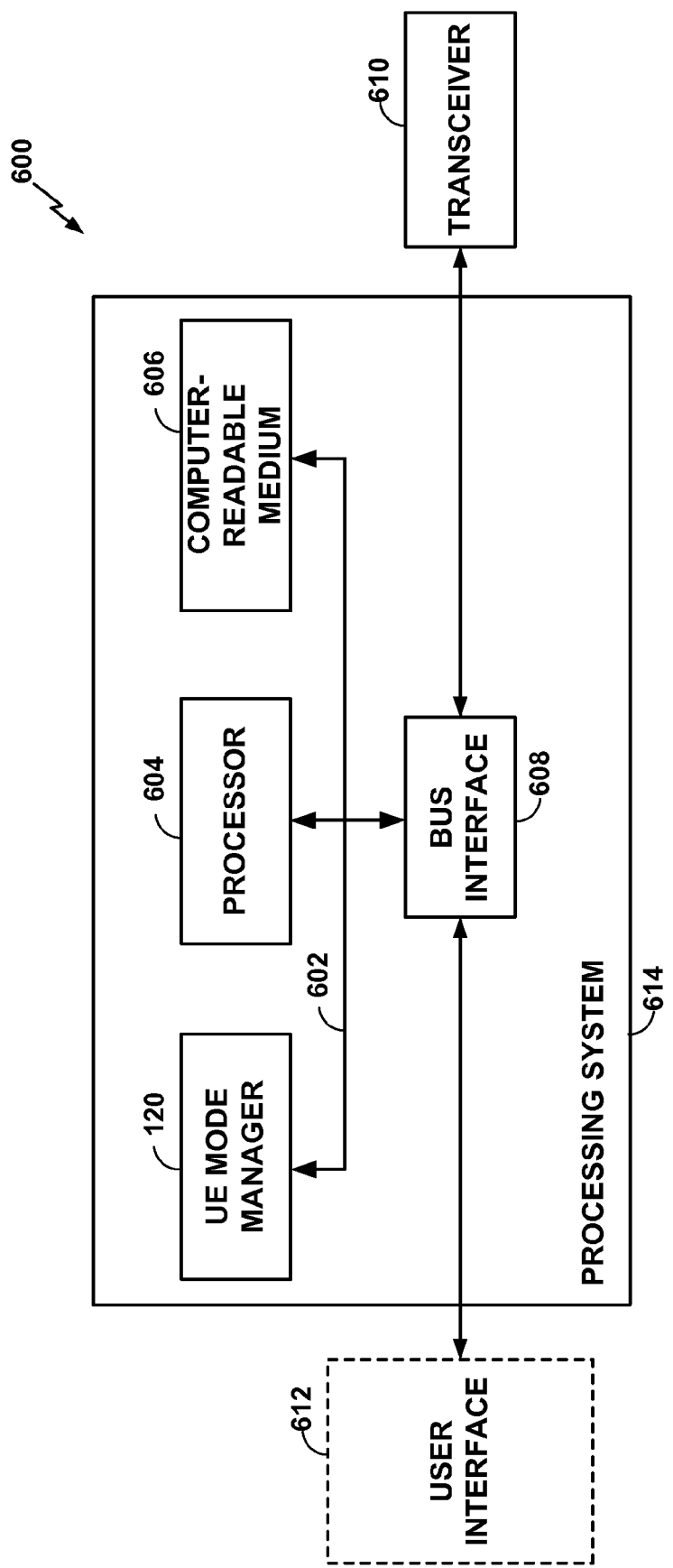
FIG. 6 is a block diagram illustrating an example of a hardware implementation for an apparatus employing a processing system.

FIG. 6 is a block diagram illustrating an example of a hardware implementation for an apparatus 600 employing a processing system 614 for carrying out aspects of the present disclosure, such as methods for improved communication mode determination for UEs in multiflow communications environments. In this example, the processing system 614 may be implemented with a bus architecture, represented generally by a bus 602. The bus 602 may include any number of interconnecting buses and bridges depending on the specific application of the processing system 614 and the overall design constraints. The bus 602 links together various circuits including one or more processors, represented generally by the processor 604, computer-readable media, represented generally by the computer-readable medium 606, and UE mode manager 120 (FIGS. 1, 2, and 5). In an aspect, UE mode manager 120 may be configured to communicate with one or more of bus interface 608, processor 604, and/or computer-readable medium 606 for storage and/or execution of instructions related to methods of UE communication mode determination and control as described in relation to at least FIG. 3.

The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described herein for any particular apparatus, including RNC 104 or any other component of FIG. 1. The computer-readable medium 606 may also be used for storing data that is manipulated by the processor 604 when executing software.

Figure 7:
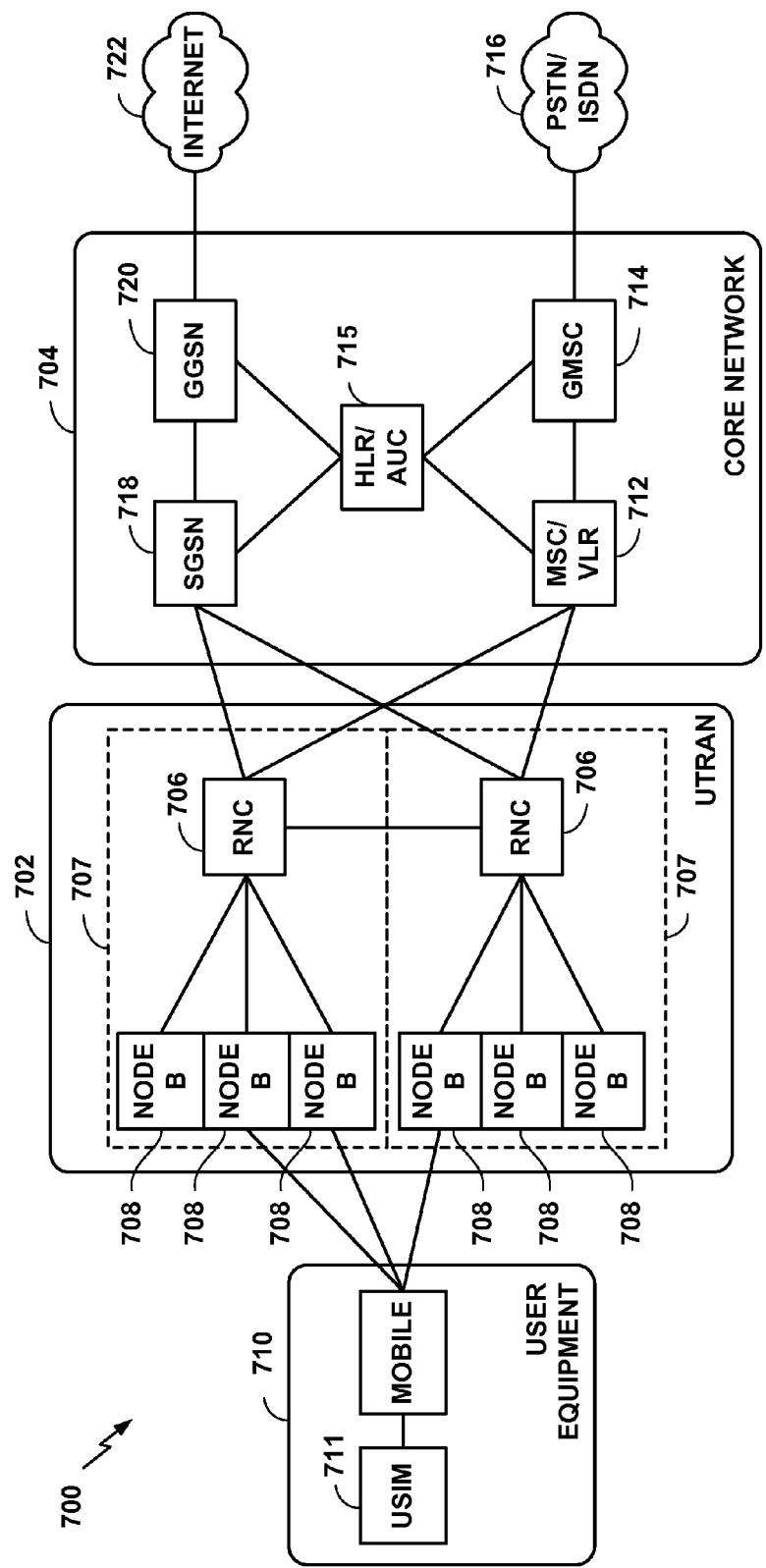
FIG. 7 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 7 are presented with reference to a UMTS system 700 employing a W-CDMA air interface. A UMTS network includes three interacting domains: a Core Network (CN) 704, a UMTS Terrestrial Radio Access Network (UTRAN) 702, and User Equipment (UE) 710. In an aspect, UE 710 may be UE 70 (FIG. 1), and UMTS 702 may comprise RNC 74 (FIG. 1 and/or FIG. 5) and/or NodeBs 72 (FIG. 1 and/or FIG. 2). In this example, the UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the RNCs 706 and RNSs 707 illustrated herein. The RNC 706 is an apparatus responsible for, among other things, assigning, reconfiguring, and releasing radio resources within the RNS 707. The RNC 706 may be interconnected to other RNCs (not shown) in the UTRAN 702 through various types of interfaces such as a direct physical connection, a virtual network, or the like, using any suitable transport network.

Communication between a UE 710 and a NodeB 708 may be considered as including a physical (PHY) layer and a medium access control (MAC) layer. Further, communication between a UE 710 and an RNC 706 by way of a respective NodeB 708 may be considered as including a radio resource control (RRC) layer. In the instant specification, the PHY layer may be considered layer 1; the MAC layer may be considered layer 7; and the RRC layer may be considered layer 3. Information hereinbelow utilizes terminology introduced in the RRC Protocol Specification, 3GPP TS 75.331 v9.1.0, incorporated herein by reference.

The geographic region covered by the RNS 707 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each RNS 707; however, the RNSs 707 may include any number of wireless Node Bs. The Node Bs 708 provide wireless access points to a CN 704 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 710 may further include a universal subscriber identity module (USIM) 711, which contains a user's subscription information to a network. For illustrative purposes, one UE 710 is shown in communication with a number of the Node Bs 708. The DL, also called the forward link, refers to the communication link from a NodeB 708 to a UE 710, and the UL, also called the reverse link, refers to the communication link from a UE 710 to a NodeB 708.

The CN 704 interfaces with one or more access networks, such as the UTRAN 702. As shown, the CN 704 is a GSM core network. However, as those skilled in the art will recognize, the various concepts presented throughout this disclosure may be implemented in a RAN, or other suitable access network, to provide UEs with access to types of CNs other than GSM networks.

The CN 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a VLR that contains subscriber-related information for the duration that a UE is in the coverage area of the MSC 712. The GMSC 714 provides a gateway through the MSC 712 for the UE to access a circuit-switched network 716. The GMSC 714 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The CN 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a NodeB 708 and a UE 710. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 710 provides feedback to the node B 708 over the HS-DPCCH to indicate whether it correctly decoded a packet on the downlink.

HS-DPCCH further includes feedback signaling from the UE 710 to assist the node B 708 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 708 and/or the UE 710 may have multiple antennas supporting MIMO technology. The use of MIMO technology enables the node B 708 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 710 to increase the data rate or to multiple UEs 710 to increase the overall system capacity. This is achieved by spatially precoding each data stream and then transmitting each spatially precoded stream through a different transmit antenna on the downlink. The spatially precoded data streams arrive at the UE(s) 710 with different spatial signatures, which enables each of the UE(s) 710 to recover the one or more the data streams destined for that UE 710. On the uplink, each UE 710 may transmit one or more spatially precoded data streams, which enables the node B 708 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 8:
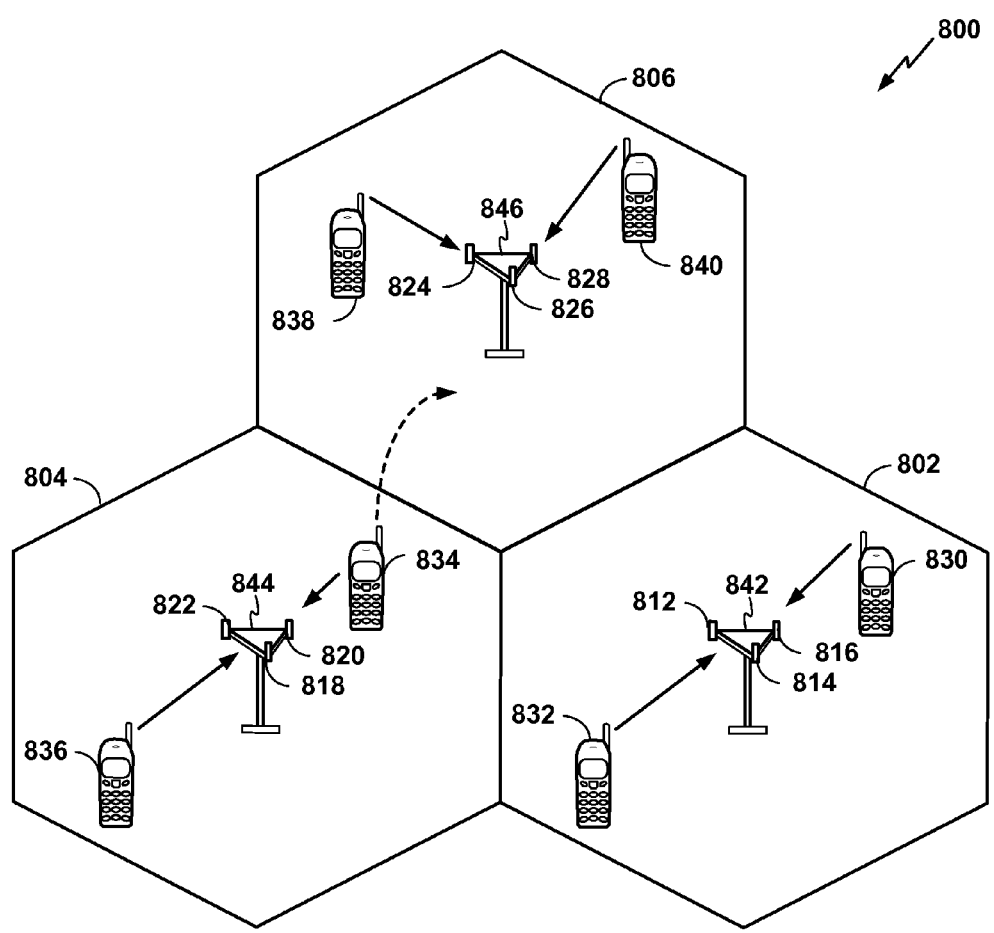
FIG. 8 is a conceptual diagram illustrating an example of an access network.

Referring to FIG. 8, an access network 800 in a UTRAN architecture is illustrated. The multiple access wireless communication system includes multiple cellular regions (cells), including cells 802, 804, and 806, each of which may include one or more sectors. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, e.g., User Equipment or UEs, which may be in communication with one or more sectors of each cell 802, 804 or 806. For example, UEs 830 and 832 may be in communication with NodeB 842, UEs 834 and 836 may be in communication with NodeB 844, and UEs 838 and 840 can be in communication with NodeB 846. Here, each NodeB 842, 844, 846 is configured to provide an access point to a CN 1004 (FIG. 4) for all the UEs 830, 832, 834, 836, 838, 840 in the respective cells 802, 804, and 806.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at a radio network controller 1006 (FIG. 6), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set).

The modulation and multiple access scheme employed by the access network 700 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 9:
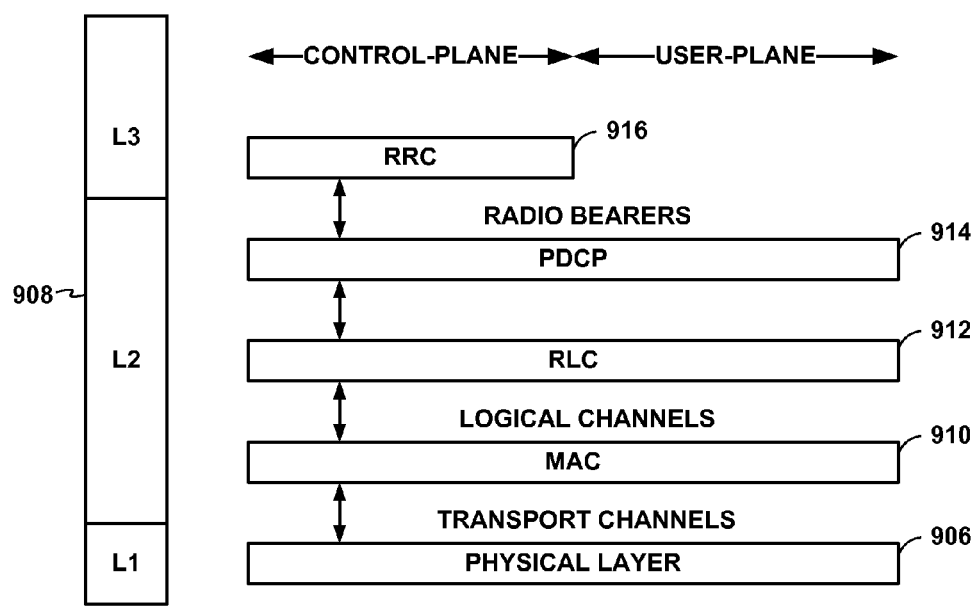
FIG. 9 is a conceptual diagram illustrating an example of a radio protocol architecture for the user and control plane.

The radio protocol architecture may take on various forms depending on the particular application. An example for an HSPA system will now be presented with reference to FIG. 9. FIG. 9 is a conceptual diagram illustrating an example of the radio protocol architecture for the user and control planes.

Turning to FIG. 9, the radio protocol architecture for the UE and node B is shown with three layers: Layer 1, Layer 2, and Layer 3. Layer 1 is the lowest lower and implements various physical layer signal processing functions. Layer 1 will be referred to herein as the physical layer 906. Layer 2 (L2 layer) 908 is above the physical layer 906 and is responsible for the link between the UE and node B over the physical layer 906.

In the user plane, the L2 layer 908 includes a media access control (MAC) sublayer 910, a radio link control (RLC) sublayer 912, and a packet data convergence protocol (PDCP) 914 sublayer, which are terminated at the node B on the network side. Although not shown, the UE may have several upper layers above the L2 layer 908 including a network layer (e.g., IP layer) that is terminated at a PDN gateway on the network side, and an application layer that is terminated at the other end of the connection (e.g., far end UE, server, etc.).

The PDCP sublayer 914 provides multiplexing between different radio bearers and logical channels. The PDCP sublayer 914 also provides header compression for upper layer data packets to reduce radio transmission overhead, security by ciphering the data packets, and handover support for UEs between NodeBs. The RLC sublayer 912 provides segmentation and reassembly of upper layer data packets, retransmission of lost data packets, and reordering of data packets to compensate for out-of-order reception due to hybrid automatic repeat request (HARQ). The MAC sublayer 910 provides multiplexing between logical and transport channels. The MAC sublayer 910 is also responsible for allocating the various radio resources (e.g., resource blocks) in one cell among the UEs. The MAC sublayer 910 is also responsible for HARQ operations.

Figure 10:
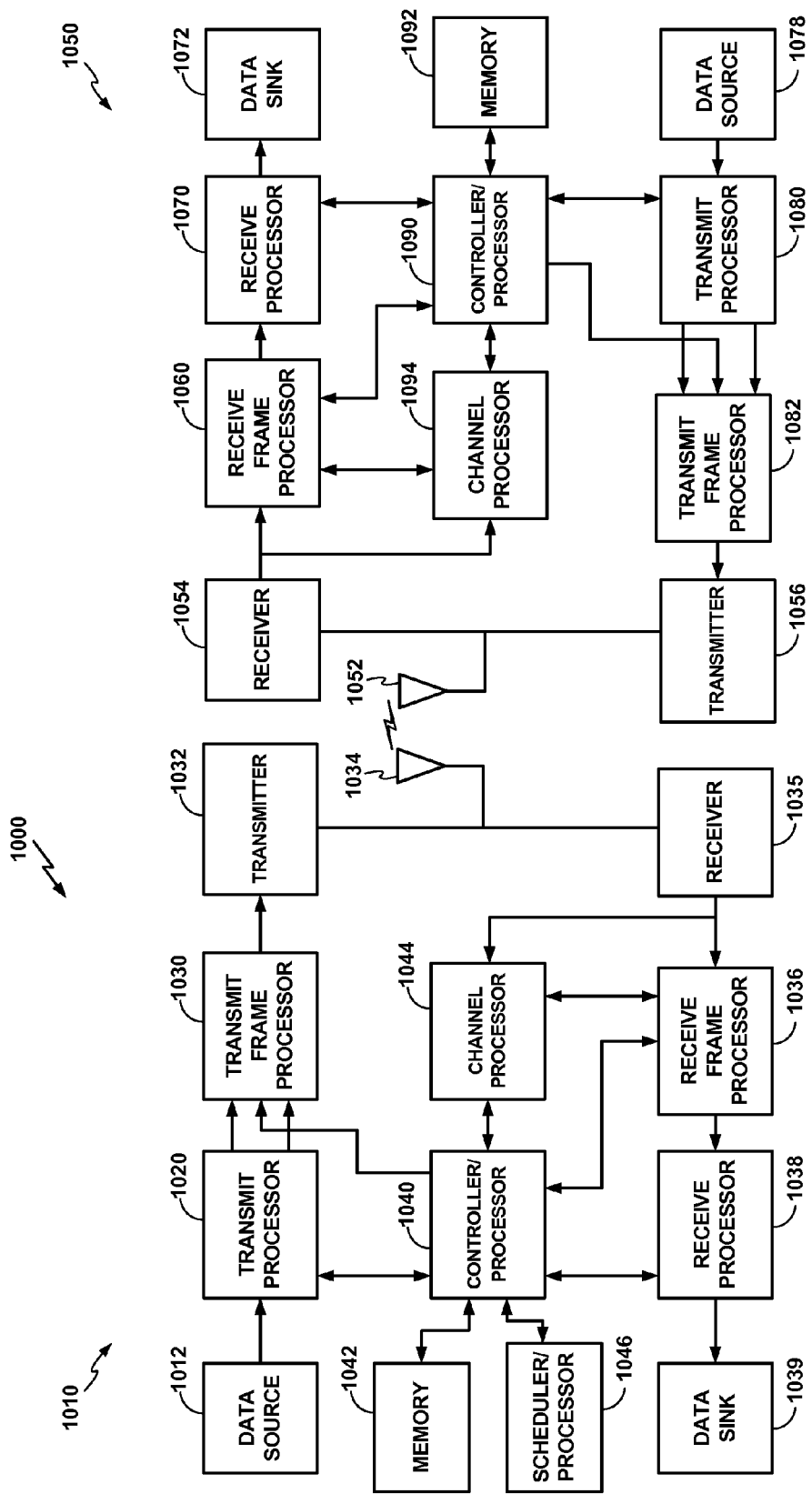
FIG. 10 is a block diagram conceptually illustrating an example of a NodeB in communication with a UE in a telecommunications system.

FIG. 10 is a block diagram of a NodeB 1010 in communication with a UE 1050, where the NodeB 1010 may be the NodeB 1008 in FIG. 10 and/or serving cell 102 of FIG. 1 and/or FIG. 2, and the UE 1050 may be the UE 1010 in FIG. 10 and/or UE 100 of FIG. 1. In the downlink communication, a transmit processor 1020 may receive data from a data source 1012 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At the UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the NodeB 1010. More specifically, the receive processor 1070 descrambles and despreads the symbols, and then determines the most likely signal constellation points transmitted by the NodeB 1010 based on the modulation scheme. These soft decisions may be based on channel estimates computed by the channel processor 1094. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded by the receiver processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the NodeB 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the NodeB 1010 or from feedback contained in the midamble transmitted by the NodeB 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the NodeB 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor, respectively. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the NodeB 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the NodeB 1010 and the UE 1050, respectively. A scheduler/processor 1046 at the NodeB 1010 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of communication control at a radio network controller (RNC) in a multicarrier wireless network, comprising:
    determining that a user equipment (UE) is in at least one of a soft handover region or a softer handover region;
    predicting a future multi-cell performance of the UE assuming the UE will be served by a plurality of cells all of which are on a same single carrier;
    predicting a future multi-carrier performance of the UE assuming the UE will be served by a plurality of carriers of a single cell;
    comparing the future multi-cell performance to the future multi-carrier performance; and
    transmitting a mode command to the UE based at least on the comparison.

2. The method of claim 1, wherein at least one of predicting the future multi-cell performance and predicting the future multi-carrier performance is based upon at least one of an air-interface load and a backhaul load.

3. The method of claim 2, further comprising determining the air-interface load by obtaining a power utilization value of one or more potential dedicated channels.

4. The method of claim 2, further comprising determining the air-interface load by obtaining a transmission time utilization value associated with traffic on one or more potential dedicated channels.

5. The method of claim 4, wherein the traffic is High-Speed Downlink Packet Access (HSDPA) traffic.

6. The method of claim 2, further comprising determining the air-interface load by obtaining a code utilization value associated with traffic on one or more potential dedicated channels.

7. The method of claim 2, further comprising determining the backhaul load by obtaining a backhaul link capacity occupancy value.

8. The method of claim 1, wherein the mode command commands the UE to communicate with the multicarrier wireless network via the plurality of carriers of the single cell based on at least:
    determining that a neighbor cell is similarly or more heavily loaded than a serving cell currently serving the UE; and
    determining that a backhaul link associated with the serving cell is not in a congested state.

9. The method of claim 1, wherein the mode command commands the UE to communicate with the multicarrier wireless network via the plurality of cells based on at least:
    determining that a neighbor cell is not more heavily loaded than a serving cell currently serving the UE; and
    determining that a backhaul link associated with the neighbor cell is not in a congested state.

10. An apparatus for wireless communication in a multi-carrier wireless network, comprising:
    means for determining that a user equipment (UE) is in at least one of a soft handover region or a softer handover region;
    means for predicting a future multi-cell performance of the UE assuming the UE will be served by a plurality of cells all of which are on a same single carrier;
    means for predicting a future multi-carrier performance of the UE assuming the UE will be served by a plurality of carriers of a single cell;
    means for comparing the future multi-cell performance to the future multi-carrier performance; and
    means for transmitting a mode command to the UE based at least on the comparison.

11. The apparatus of claim 10, wherein at least one of predicting the future multi-cell performance and predicting the future multi-carrier performance is based upon at least one of an air-interface load and a backhaul load.

12. The apparatus of claim 11, further comprising means for determining the air-interface load by obtaining a power utilization value of one or more potential dedicated channels.

13. The apparatus of claim 11, further comprising means for determining the air-interface load by obtaining a transmission time utilization value associated with traffic on one or more potential dedicated channels.

14. The apparatus of claim 13, wherein the traffic is High-Speed Downlink Packet Access (HSDPA) traffic.

15. The apparatus of claim 11, further comprising means for determining the air-interface load by obtaining a code utilization value associated with traffic on one or more potential dedicated channels.

16. The apparatus of claim 11, further comprising means for determining the backhaul load by obtaining a backhaul link capacity occupancy value.

17. The apparatus of claim 10, wherein the mode command commands the UE to communicate with the multicarrier wireless network via the plurality of carriers of the single cell based on a determination of one of:
    means for determining that a neighbor cell is similarly or more heavily loaded than a serving cell currently serving the UE; and
    means for determining that a backhaul link associated with the serving cell is not in a congested state.

18. The apparatus of claim 10, wherein the mode command commands the UE to communicate with the multicarrier wireless network via the plurality of cells based on at least a determination of one of:
    means for determining that a neighbor cell is not more heavily loaded than a serving cell currently serving the UE; and
    means for determining that a backhaul link associated with the neighbor cell is not in a congested state.

19. A non-transitory computer-readable medium comprising code for:
    determining that a user equipment (UE) is in at least one of a soft handover region or a softer handover region;
    predicting a future multi-cell performance of the UE assuming the UE will be served by a plurality of cells all of which are on a same single carrier;
    predicting a future multi-carrier performance of the UE assuming the UE will be served by a plurality of carriers of a single cell;
    comparing the future multi-cell performance to the future multi-carrier performance; and
    transmitting a mode command to the UE based at least on the comparison.

20. The computer readable medium of claim 19, wherein at least one of the code for predicting the future multi-cell performance and the code for predicting the future multi-carrier performance is based upon at least one of an air-interface load and a backhaul load.

21. The computer readable medium product of claim 20, further comprising code for determining the air-interface load by obtaining a power utilization value of one or more potential dedicated channels.

22. The computer readable medium of claim 20, further comprising code for determining the air-interface load by obtaining a transmission time utilization value associated with traffic on one or more potential dedicated channels.

23. The computer readable medium of claim 22, wherein the traffic is High-Speed Downlink Packet Access (HSDPA) traffic.

24. The computer readable medium of claim 20, further comprising code for determining the air-interface load by obtaining a code utilization value associated with traffic on one or more potential dedicated channels.

25. The computer program readable medium claim 20, further comprising code for determining the backhaul load by obtaining a backhaul link capacity occupancy value.

26. The computer readable medium of claim 19, wherein the mode command commands the UE to communicate with the multicarrier wireless network via the plurality of carriers of the single cell based on at least:
    code for determining that a neighbor cell is similarly or more heavily loaded than a serving cell currently serving the UE; and
    code for determining that a backhaul link associated with the serving cell is not in a congested state.

27. The computer readable medium of claim 19, wherein the mode command commands the UE to communicate with the multicarrier wireless network via the plurality of cells based on at least:
    determining that a neighbor cell is not more heavily loaded than a serving cell currently serving the UE; and
    determining that a backhaul link associated with the neighbor cell is not in a congested state.

28. An apparatus for wireless communication, comprising:
    at least one processor; and
    a memory coupled to the at least one processor, wherein the at least one processor is configured to:
        determine that a user equipment (UE) is in at least one of a soft handover region or a softer handover region;
        predict a future multi-cell performance of the UE assuming the UE will be served by a plurality of cells all of which are on a same single carrier;
        predict a future multi-carrier performance of the UE assuming the UE will be served by a plurality of carriers of a single cell;
        compare the future multi-cell performance to the future multi-carrier performance; and
        transmit a mode command to the UE based at least on the comparison.

29. The apparatus of claim 28, wherein at least one of predicting the future multi-cell performance and predicting the future multi-carrier performance is based upon at least one of an air-interface load and a backhaul load.

30. The apparatus of claim 29, wherein the at least one processor is further configured to determine the air-interface load by obtaining a power utilization value of one or more potential dedicated channels.

31. The apparatus of claim 29, wherein the at least one processor is further configured to determine the air-interface load by obtaining a transmission time utilization value associated with traffic on one or more potential dedicated channels.

32. The apparatus of claim 31, wherein the traffic is High-Speed Downlink Packet Access (HSDPA) traffic.

33. The apparatus of claim 29, wherein the at least one processor is further configured to determine the air-interface load by obtaining a code utilization value associated with traffic on one or more potential dedicated channels.

34. The apparatus of claim 29, wherein the at least one processor is further configured to determine the backhaul load by obtaining a backhaul link capacity occupancy value.

35. The apparatus of claim 28, wherein the mode command commands the UE to communicate with the multicarrier wireless network via the plurality of carriers of the single cell based on at least:
    determining that a neighbor cell is similarly or more heavily loaded than a serving cell currently serving the UE; and
    determining that a backhaul link associated with the serving cell is not in a congested state.

36. The apparatus of claim 28, wherein the mode command commands the UE to communicate with the multicarrier wireless network via the plurality of cells based on at least:
    determining that a neighbor cell is not more heavily loaded than a serving cell currently serving the UE; and
    determining that a backhaul link associated with the neighbor cell is not in a congested state.

* * * * *